United States Patent [19]

Takahashi

[11] Patent Number: 5,768,027
[45] Date of Patent: Jun. 16, 1998

[54] COMA ABERRATION CORRECTING METHOD AND APPARATUS IN OPTICAL PICKUP

[75] Inventor: Shinichi Takahashi, Tokorozawa, Japan

[73] Assignee: Pioneer Electronic Corporation, Tokyo-to, Japan

[21] Appl. No.: 895,636

[22] Filed: Jul. 17, 1997

[30] Foreign Application Priority Data

Jul. 18, 1996 [JP] Japan ................................. 8-189687

[51] Int. Cl.⁶ ............................................... G02B 27/14
[52] U.S. Cl. .................. 359/637; 250/201.5; 250/578.1; 356/138; 369/103; 369/112
[58] Field of Search ................... 359/637; 250/201.5, 250/578.1; 356/138, 359; 369/103, 109, 112, 44.37, 44.38

[56] References Cited

U.S. PATENT DOCUMENTS

| | | | |
|---|---|---|---|
| 5,157,459 | 10/1992 | Oono et al. | 356/359 |
| 5,311,288 | 5/1994 | Shahar | 250/201.5 |
| 5,317,144 | 5/1994 | Oono et al. | 250/201.5 |
| 5,399,849 | 3/1995 | Jung | 250/201.5 |
| 5,513,158 | 4/1996 | Ohsato | 250/201.5 |
| 5,553,052 | 9/1996 | Oono et al. | 369/112 |

*Primary Examiner*—Loha Ben
*Attorney, Agent, or Firm*—Young & Thompson

[57] ABSTRACT

A coma aberration correcting method in an optical pickup for generating a plurality of light beams forming a plurality of light focused points is provided with processes of: measuring an optimum angle which is an angle with respect to respective one of the information record media of the pickup body by tilting the pickup body while irradiating each of the light beams under a condition where the actuator is fixed on the pickup body; calculating a pickup body fixing angle on the basis of (i) a first variation rate measured in case that only the actuator is tilted with respect to respective media, (ii) a second variation rate measured in case that the actuator is fixed on the pickup body and that the pickup body as a whole is tilted with respect to respective one of the information record media, and (iii) the measured optimum angle; calculating an actuator fixing angle; and fixing the pickup body so as to have the calculated pickup body fixing angle, and fixing the actuator on the pickup body so as to have the calculated actuator fixing angle.

10 Claims, 13 Drawing Sheets

TAN DIRECTION

RAD DIRECTION

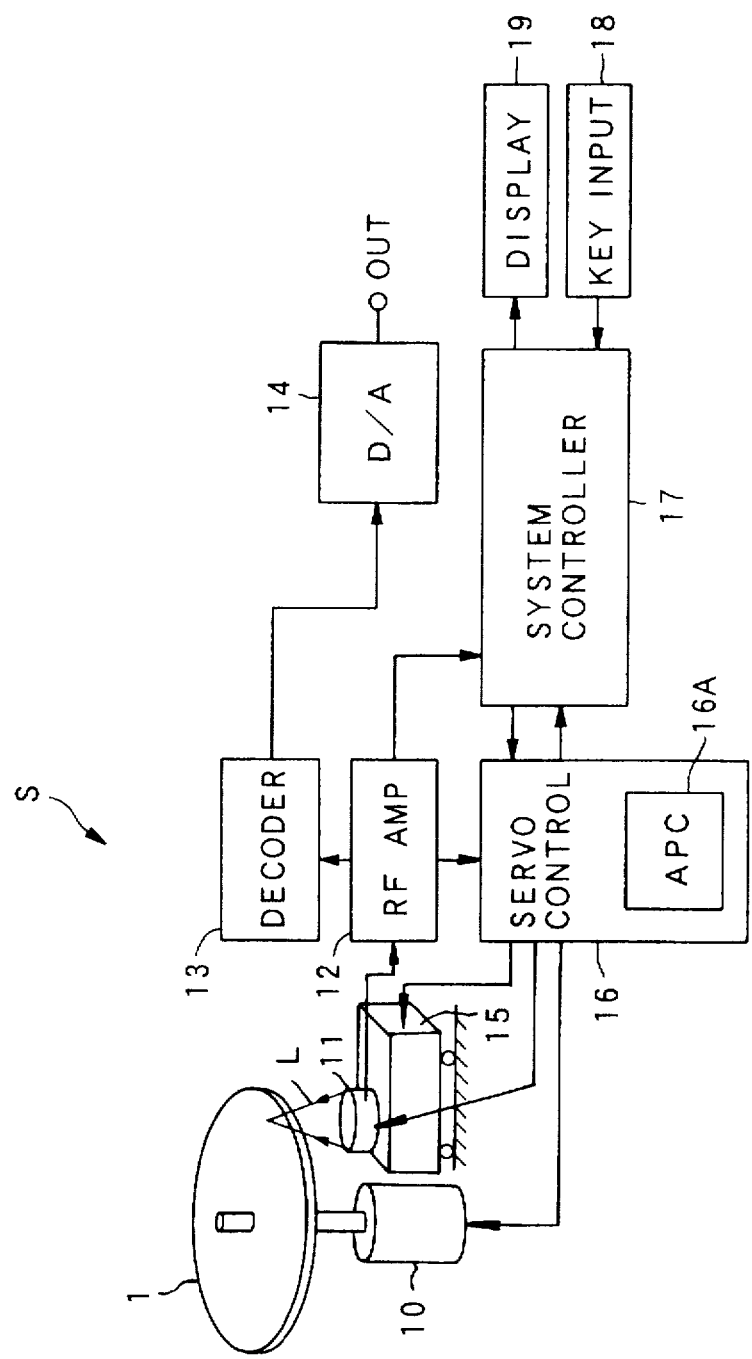

TAN DIRECTION

RAD DIRECTION

TAN DIRECTION

RAD DIRECTION

SOLID LINE: CD REPRODUCTION
BROKEN LINE: DVD REPRODUCTION

COMA ABERRATION CORRECTING METHOD AND APPARATUS IN OPTICAL PICKUP

BACKGROUND OF THE INVENTION

1. Field of the Invention

The present invention relates to a coma aberration correcting method and apparatus for correcting a coma aberration included in each of a plurality of light beams, in an optical pickup for generating the light beams to respectively form a plurality of light focused points, in order to treat in one recording and reproducing apparatus a plurality of types of disks in which thicknesses of protective layers i.e. distances from disk surfaces to information record surfaces are different from each other, such as a CD (Compact Disk) and a DVD (a high record density disk whose memory capacity is dramatically improved while it has the same size as the CD).

2. Description of the Related Art

The DVD is a high density record medium, whose memory capacity is dramatically improved over a conventional CD and which can record one movie and the like on one disk. A CD/DVD compatible player is proposed and being developed, which can reproduce both the DVD and the CD.

Then comparing a structure of the DVD with that of the CD, a protective layer of the DVD has a thickness (0.6 mm) equal to approximately ½ of that of the CD, from a request of a high record density. Thus, if it is tried to reproduce both the disks by using an optical pickup having just one focus, for example, if a beam collection action is performed optimally for the DVD, since the protective layer of the CD through which the light beam is passed is thicker than that of the DVD, an aberration such as a spherical aberration or the like is generated in the light beam with respect to the CD. This results in a problem that the beam collection action cannot be performed optimally for the CD.

Moreover, sizes of information pits formed for recording in the CD and the DVD are different from each other (more concretely, a length of the shortest pit formed on the CD is approximately 0.87 μm, while a length of the shortest pit formed on the DVD is approximately 0.4 μm). Thus, in order to accurately read each of the information pits on these disks, it is necessary to form on the CD or the DVD an optical spot having an optimum size for the size of each of the information pits.

The size (diameter) of the light spot is proportional to a ratio of a wave length of the light beam to a numerical aperture of an objective lens for collecting the light beam on the information record surface. That is, assuming that the wave length of the light beam is constant, the more is the numerical aperture, the smaller is the size of the light spot. Thus, in a case of reproducing the CD or the DVD by using the optical pickup having just one focus, if the wave length of the light beam is constant and the numeral aperture is, for example, set suitable for the information pit of the DVD, the light spot is too small for the information pit of the CD, and thereby a distortion is brought about in a reproduction signal when reproducing the CD. This results in a problem that it is impossible to accurately perform the reading operation for the CD.

In order to solve the above respective problems, a bifocal optical pickup provided with a bifocal lens may be developed, which forms two light focused points on the respective information record surfaces of the CD and the DVD, and also irradiates two light beams of respectively generating two light spots having sizes suitable for the sizes of the respective information pits of the CD and the DVD.

By using this bifocal lens, it may be possible to use one optical pickup to reproduce both of the CD and the DVD.

The bifocal lens is fixed inside of an actuator which includes: a focus actuator for servo-driving the bifocal lens in a direction perpendicular to the information record surface of the CD or the DVD to thereby perform a focus servo control; and a tracking actuator for servo-driving it in a tracking direction in the CD or the DVD to thereby perform a tracking servo control. The actuator is fixed on a pickup body, which includes the collimator lens, a laser diode and the like. Moreover, the pickup body is supported movably in the tracking direction on a so-called carriage so as to drive the pickup body in the tracking direction.

However, in the actual optical pickup, an incident angle of the light beam from the pickup body to the actuator is deviated from a perpendicular direction for an incident surface of the diffraction grating (wherein a deviation angle is assumed to be θ) because of an error in a manufacturing process and the like, in many cases. However, in these cases, optical axes of the 0 order light and the +1 order light are tilted by θ with respect to the information record surface. Hence, the coma aberrations are generated in the 0 order light and the +1 order light, on the information record surface in these cases. Noise components, such as a jitter and the like, are mixed in information detection components, due to this coma aberration.

The present applicant knows that values of the coma aberrations respectively generated in the 0 order light and the +1 order light for the same deviation angle θ are different from each other. According to a more actual experiment, for example, in a case where the deviation angle is 0.5 degrees, the coma aberration in the 0 order light is 0.145 λ (λ is a wave length of the light beam), while, in the +1 order light, a coma aberration of 0.365 λ is generated in a direction opposite to that in the 0 order light. If it is tried to correct and remove the coma aberration in the +1 order light in the conventional bifocal optical pickup in which the actuator is fixed integrally to the pickup body, it is necessary to tilt the bifocal optical pickup as a whole by an angle of 1 degree with respect to the information record surface. However, if it is tilted in this manner, the coma aberration in the 0 order light is increased to 0.73 λ, so that it is impossible to reproduce the information from the DVD in stable. This results in a problem that it is impossible to simultaneously remove the coma aberrations for both of the 0 order light and the +1 order light.

SUMMARY OF THE INVENTION

From the viewpoint of the above mentioned problems, it is therefore an object of the present invention to provide, in the optical pickup for generating a plurality of light beams to respectively form a plurality of light focused points, such as a bifocal lens etc., a coma aberration correcting method and apparatus in the optical pickup, which can reduce both of the coma aberrations in the respective light beams.

The above object of the present invention can be achieved by a first coma aberration correcting method in an optical pickup for generating a plurality of light beams, such as laser beams etc., forming a plurality of light focused points respectively through an objective lens to thereby record and/or reproduce information onto and/or from a plurality of types of information record media, such as a CD, a DVD, etc., corresponding to the light beams respectively. The optical pickup is provided with (i) an actuator containing a light generation device for generating the light beams based on a source light beam, such as a laser beam etc., and the objective lens for respectively collecting the light beams generated by the light generation device on the information record media respectively and (ii) a pickup body containing an optical section, such as a laser diode or the like, for generating the source light beam. The first method is provided with: a measuring process of measuring an optimum angle, for each of the light beams, which is an angle with respect to respective one of the information record media of the pickup body at which an error rate is the minimum at a time of reproducing the information, by tilting the pickup body with respect to respective one of the information record media while irradiating each of the light beams onto respective one of the information record media under a condition where the actuator is fixed on the pickup body; a body angle calculating process of calculating a pickup body fixing angle, which is an angle with respect to respective one of the information record media at a time of fixing the pickup body on a supporting device, such as a carriage or the like, for supporting the pickup body, on the basis of (i) a first variation rate measured in advance, which is a variation rate of a coma aberration with respect to a tilt angle of the actuator generated on respective one of the information record media in correspondence with each of the light beams in case that only the actuator is tilted with respect to respective one of the information record media, (ii) a second variation rate measured in advance, which is a variation rate of a coma aberration with respect to a tilt angle of the pickup body generated on respective one of the information record media in correspondence with each of the light beams in case that the actuator is fixed on the pickup body and that the pickup body as a whole is tilted with respect to respective one of the information record media, and (iii) the measured optimum angle; an actuator angle calculating process of calculating an actuator fixing angle, which is an angle with respect to respective one of the information record media at a time of fixing the actuator on the pickup body, on the basis of the first variation rate, the second variation rate and the measured optimum angle; and a fixing process of fixing the pickup body on the supporting device so as to have the calculated pickup body fixing angle, and fixing the actuator on the pickup body so as to have the calculated actuator fixing angle.

According to the first method of the present invention, at first, by the measuring process, the optimum angle is measured, for each of the light beams, which is an angle with respect to respective one of the information record media of the pickup body at which an error rate is the minimum at a time of reproducing the information, by tilting the pickup body with respect to respective one of the information record media while irradiating each of the light beams onto respective one of the information record media under a condition where the actuator is fixed on the pickup body. Then, by the body angle calculating process, the pickup body fixing angle is calculated, which is an angle with respect to respective one of the information record media at a time of fixing the pickup body on the supporting device, on the basis of the first and second variation rates measured in advance, and the measured optimum angle. Then, by the actuator angle calculating process, the actuator fixing angle is calculated, which is an angle with respect to respective one of the information record media at a time of fixing the actuator on the pickup body, on the basis of the first and second variation rates and the measured optimum angle. Finally, by the fixing process, the pickup body is fixed on the supporting device so as to have the calculated pickup body fixing angle, and the actuator is fixed on the pickup body so as to have the calculated actuator fixing angle.

Therefore, by calculating the pickup body fixing angle on the basis of the first and second variation rates and the optimum angle, it is possible to adjust the coma aberration generated in one of the light beams and the coma aberration generated in another of the light beams. Moreover, by calculating the actuator fixing angle on the basis of the first and second variation rates and the optimum angle, and by utilizing the fact that the generation direction of the coma aberration generated in one of the light beams when only the actuator including the objective lens is tilted is opposite to that in another of the light beams, it is possible to remove both of the coma aberrations generated in one and another of the light beams after the adjustment. In this manner, it is possible to remove the coma aberrations in the respective light beams, in the optical pickup for generating the light beams forming a plurality of light focused points, by using just one objective lens.

Therefore, by removing the coma aberration, an optical pickup capable of recording and reproducing the information with high quality and with less jitter etc. can be realized according to the first method.

The above object of the present invention can be also achieved by a second coma aberration correcting method in the above described optical pickup of the present invention. The second method is provided with: a measuring process of measuring an optimum angle, for each of the light beams, which is an angle with respect to respective one of the information record media of the pickup body at which an error rate is the minimum at a time of reproducing the information, by tilting the pickup body with respect to respective one of the information record media while irradiating each of the light beams onto respective one of the information record media under a condition where the actuator is fixed on the pickup body; a body angle calculating process of calculating a pickup body fixing angle, which is an angle with respect to respective one of the information record media at a time of fixing the pickup body on a supporting device for supporting the pickup body, on the basis of (i) a first variation rate measured in advance, which is a variation rate of a coma aberration with respect to a tilt angle of the actuator generated on respective one of the information record media in correspondence with each of the light beams in case that only the actuator is tilted with respect to respective one of the information record media, (ii) a second variation rate measured in advance, which is a variation rate of a coma aberration with respect to a tilt angle of the pickup body generated on respective one of the information record media in correspondence with each of the light beams in case that the actuator is fixed on the pickup body and that the pickup body as a whole is tilted with respect to respective one of the information record media, and (iii) the measured optimum angle; a body fixing process of fixing the pickup body on the supporting device so as to have the calculated pickup body fixing angle; an actuator angle calculating process of calculating an actuator fixing angle, which is an angle with respect to respective one of the information record media at a time of fixing the actuator on the pickup body, after the body fixing process, on the basis of the first variation rate, the second variation rate and the measured optimum angle; and an actuator fixing process of fixing the actuator on the pickup body so as to have the calculated actuator fixing angle.

According to the second method of the present invention, at first, by the measuring process, the optimum angle is measured, for each of the light beams, which is an angle with respect to respective one of the information record media of the pickup body at which an error rate is the minimum at a time of reproducing the information, by tilting the pickup body with respect to respective one of the information record media while irradiating each of the light beams onto respective one of the information record media under a condition where the actuator is fixed on the pickup body. Then, by the body angle calculating process, the pickup body fixing angle is calculated on the basis of the first and second variation rates and the measured optimum angle. Then, by the body fixing process, the pickup body is fixed on the supporting device so as to have the calculated pickup body fixing angle. After this body fixing process, by the actuator angle calculating process, the actuator fixing angle is calculated on the basis of the first and second variation rates and the measured optimum angle. Finally, by the actuator fixing process, the actuator is fixed on the pickup body so as to have the calculated actuator fixing angle.

Therefore, by calculating the pickup body fixing angle on the basis of the first and second variation rates and the optimum angle, it is possible by the body fixing process to adjust the coma aberration generated in one of the light beams and the coma aberration generated in another of the light beams. Moreover, by calculating the actuator fixing angle on the basis of the first and second variation rates and the optimum angle, and by utilizing the fact that the generation direction of the coma aberration generated in one of the light beams when only the actuator including the objective lens is tilted is opposite to that in another of the light beams, it is possible by the actuator fixing process to remove both of the coma aberrations generated in one and another of the light beams after the adjustment by the body fixing process. In this manner, it is possible to remove the coma aberrations in the respective light beams, in the optical pickup for generating the light beams forming a plurality of light focused points, by using just one objective lens.

Therefore, by removing the coma aberration, an optical pickup capable of recording and reproducing the information with high quality and with less jitter etc. can be realized according to the second method.

In one aspect of the first or second method of the present invention, the light generation device may comprise a hologram diffraction element disposed on an optical path of the source light beam.

According to this aspect, by virtue of the hologram diffraction element, it is possible to generate a plurality of light beams without a mechanical element.

In another aspect of the first or second method of the present invention, the light generation device may generate one of the light beams by inserting a concave lens on an optical path of the source light beam and inputting the source light beam through the concave lens into the objective lens, and generate another of the light beams by inputting the source light beam directly into the objective lens.

According to this aspect, by virtue of the concave lens selectively inserted on the optical path of the source light beam, it is possible to generate a plurality of light beams without a hologram diffraction element, which is rather complicated and rather expensive.

The above object of the present invention can be also achieved by a coma aberration correcting apparatus in the above described optical pickup of the present invention. The apparatus is provided with: a body fixing device for fixing the pickup body on a supporting device for supporting the pickup body so as to have a pickup body fixing angle, which is an angle with respect to respective one of the information record media at a time of fixing the pickup body on the supporting device, the pickup body fixing angle being calculated on the basis of (i) a first variation rate measured in advance, which is a variation rate of a coma aberration with respect to a tilt angle of the actuator generated on respective one of the information record media in correspondence with each of the light beams in case that only the actuator is tilted with respect to respective one of the information record media, (ii) a second variation rate measured in advance, which is a variation rate of a coma aberration with respect to a tilt angle of the pickup body generated on respective one of the information record media in correspondence with each of the light beams in case that the actuator is fixed on the pickup body and that the pickup body as a whole is tilted with respect to respective one of the information record media, and (iii) an optimum angle, for each of the light beams, which is an angle with respect to respective one of the information record media of the pickup body at which an error rate is the minimum at a time of reproducing the information, the optimum angle being measured by tilting the pickup body with respect to respective one of the information record media while irradiating each of the light beams onto respective one of the information record media under a condition where the actuator is fixed on the pickup body; and an actuator fixing device for fixing the actuator on the pickup body so as to have an actuator fixing angle, which is an angle with respect to respective one of the information record media at a time of fixing the actuator on the pickup body, the actuator fixing angle being calculated on the basis of the first variation rate, the second variation rate and the measured optimum angle.

According to the apparatus of the present invention, by the body fixing device, the pickup body is fixed on the supporting device so as to have the pickup body fixing angle, which is calculated on the basis of the first and second variation rates and the measured optimum angle. Then, by the actuator fixing device, the actuator is fixed on the pickup body so as to have the actuator fixing angle, which is calculated on the basis of the first and second variation rates and the measured optimum angle.

Therefore, by fixing the pickup body on the supporting device so as to have the fixing angle calculated on the basis of the first and second variation rates and the optimum angle, it is possible to adjust the coma aberration generated in one of the light beams and the coma aberration generated in another of the light beams. Moreover, by fixing the actuator on the pickup body so as to have the actuator fixing angle calculated on the basis of the first and second variation rates and the optimum angle, and by utilizing the fact that the generation direction of the coma aberration generated in one of the light beams when only the actuator including the objective lens is tilted is opposite to that in another of the light beams, it is possible to remove both of the coma aberrations generated in one and another of the light beams after the adjustment by the body fixing device. In this manner, it is possible to remove the coma aberrations in the respective light beams, in the optical pickup for generating the light beams forming a plurality of light focused points, by using just one objective lens.

Therefore, by removing the coma aberration, an optical pickup capable of recording and reproducing the information with high quality and with less jitter etc. can be realized according to the apparatus of the present invention.

In one aspect of the apparatus of the present invention, the apparatus may be further provided with: a measuring device for measuring the optimum angle; a body angle calculating device for calculating the pickup body fixing angle; and an actuator angle calculating device for calculating the actuator fixing angle.

According to this aspect, the optimum angle is measured by the measuring device. Then, on the basis of this measured optimum angle, the pickup body fixing angle is calculated by the body angle calculating device, and the actuator fixing angle is calculated by the actuator angle calculating device.

In another aspect of the apparatus of the present invention, the light generation device may comprise a hologram diffraction element disposed on an optical path of the source light beam.

According to this aspect, by virtue of the hologram diffraction element, it is possible to generate a plurality of light beams without a mechanical element.

In another aspect of the apparatus of the present invention, the light generation device may generate one of the light beams by inserting a concave lens on an optical path of the source light beam and inputting the source light beam through the concave lens into the objective lens, and generate another of the light beams by inputting the source light beam directly into the objective lens.

According to this aspect, by virtue of the concave lens selectively inserted on the optical path of the source light beam, it is possible to generate a plurality of light beams without a hologram diffraction element, which is rather complicated and rather expensive.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1A is a block diagram of an information reproducing apparatus as an embodiment of the present invention;

DETAILED DESCRIPTION OF THE PREFERRED EMBODIMENTS

Figure 1C:
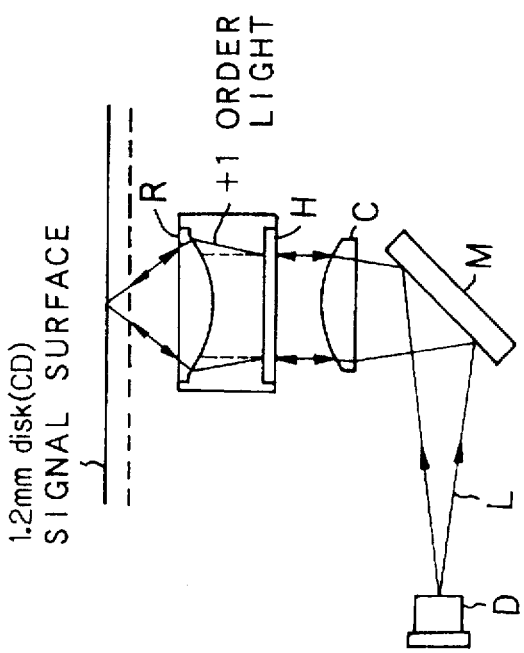
FIG. 1C is a diagram showing the structure of the bifocal lens and a light path of a light beam for the CD (i.e. the +1 order light) in the embodiment.

Next, preferred embodiments of the present invention are explained with reference to the drawings. It will be explained hereinbelow a case where the present invention is applied to a coma aberration correction in an information reproducing apparatus provided with an optical pickup, which can treat both of the CD and the DVD by using just one optical pickup.

(I) Construction of Information Reproducing Apparatus

At first, a construction of the information reproducing apparatus as an embodiment of the present invention is explained with reference to FIGS. 1A to 5.

As shown in FIG. 1A, an information reproducing apparatus S as the embodiment is provided with: a spindle motor 10, an optical pickup 11; an RF (Radio Frequency) amplifier 12; a decoder 13; a D/A (Digital to Analog) converter 14; a carriage 15; a servo control circuit 16 including an APC (Automatic Power Controller) 16A; a system controller 17; a key input section 18; and a display section 19.

Next, a whole operation of the information reproducing apparatus S is explained. The spindle motor 10 rotation-drives an optical disk 1, which is the CD or the DVD.

The optical pickup 11 is movably supported in a radial direction of the optical disk 1 on the carriage 15, and is also provided with a laser diode, an actuator (including an objective lens), a photo-detector and the like which are described later. The optical pickup 11 irradiates a light beam L, such as a laser light or the like, as a reproduction light to the rotated optical disk 1, and then outputs as an RF (Radio Frequency) signal a signal component in the light beam L as a reflection light reflected by the optical disk 1.

Accordingly, the RF amplifier 12 amplifies the RF signal up to a predetermined level.

Then, the decoder 13 extracts a modulation signal corresponding to the record information from among the amplified RF signal, to thereby demodulate it.

On the other hand, the carriage 15 moves the optical pickup 11 in the radial direction of the optical disk 1, in order to irradiate the light beam L to a position on the optical disk 1 on which the record information to be reproduced is recorded, at a time of reproducing the information.

Moreover, the servo control circuit 16 servo-controls the carriage 15 and the objective lens in the actuator described later such that the light beam L is focused on the record position of the record information to be reproduced. At this time, the APC circuit 16A included in the servo control circuit 16 controls a drive current to the laser diode in the optical pickup 11 on the basis of a strength of the light beam L, which is detected by a monitoring photo-diode mounted on the laser diode in the optical pickup 11, so as to maintain the strength of the light beam L at a reproduction power for the information reproduction.

The system controller 17 is composed of a microcomputer and the like, and controls the information reproducing apparatus S as a whole. At this time, the key input section 18 gives a predetermined operation instruction from the external to a system controller 17. The display section 19 displays necessary information such as an information reproduction state and the like. In addition, the system controller 17 counts the number of blocks at which a block error is brought about within a predetermined period, among a plurality of blocks constituting the RF signal, and divides the number by a total block number within the predetermined period to thereby determine an error rate in the RF signal.

The bifocal lens for use in the present embodiment is explained in detail with reference to FIGS. 1B and 1C.

As shown in FIG. 1A, the bifocal lens has such a construction that a diffraction element H, such as a hologram diffraction element or the like and, an objective lens R are arranged on the same line. The light beam L, which is emitted from a laser diode D, reflected by a half mirror H and collimated by a collimator lens C, is separated into three light beams of a 0 order light, a +1 order light and a −1 order light by the diffraction element H. The 0 order light and the +1 order light among these light beams are focused on different positions from each other on a substantially straight line by using a characteristic that a focal length for the 0 order light is different from that for the +1 order light. At this time, the light beam transmitted through the diffraction element H is the 0 order light among the light beams, and the light beam diffracted by a diffraction pattern of the diffraction element H is the +1 order light among the light beams.

Figure 1B:
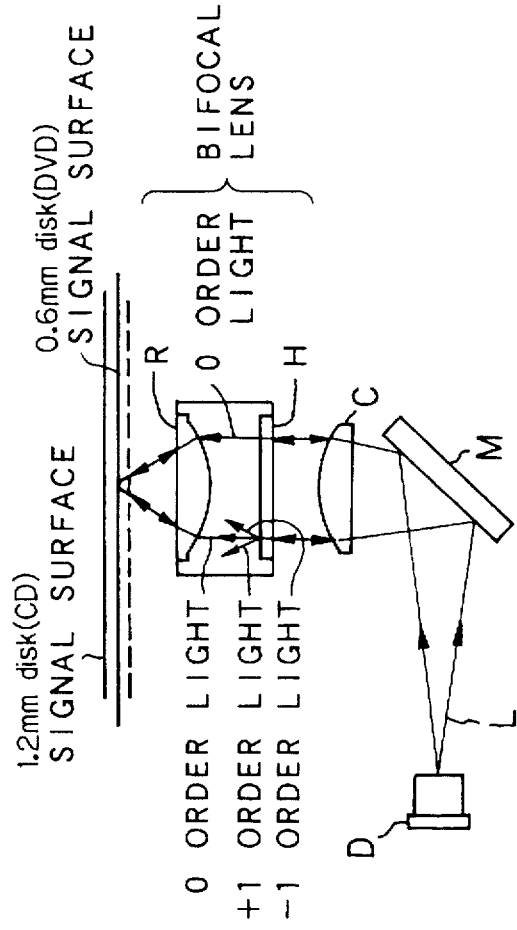
FIG. 1B is a diagram showing a structure of a bifocal lens and a light path of a light beam for the DVD (i.e. the 0 order lighit) in the embodiment.

Actually, the bifocal lens is constructed such that the +1 order light is focused on a farther position from the objective lens R as compared with the 0 order light, and that the 0 order light is optimally collected or focused on the information record surface of the DVD (whose distance from the disk surface to the information record or signal surface is about 0.6 mm), while the +1 order light is optimally collected or focused on the information record surface of the CD (whose distance from the disk surface to the information record or signal surface is about 1.2 mm) as shown in FIG. 1B.

Figure 2:
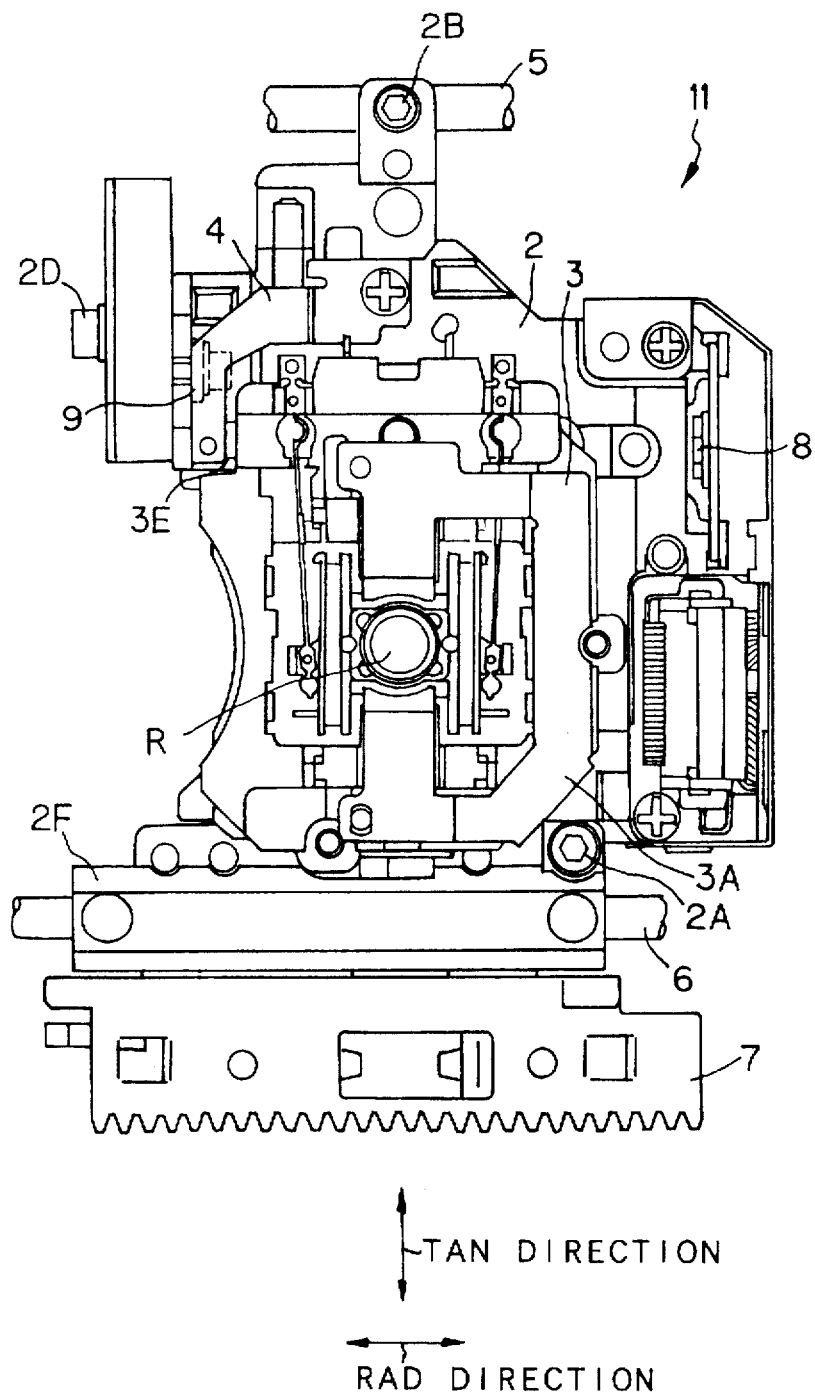
FIG. 2 is a plan view of an optical pickup of the information reproducing apparatus of the embodiment.
Figure 3:
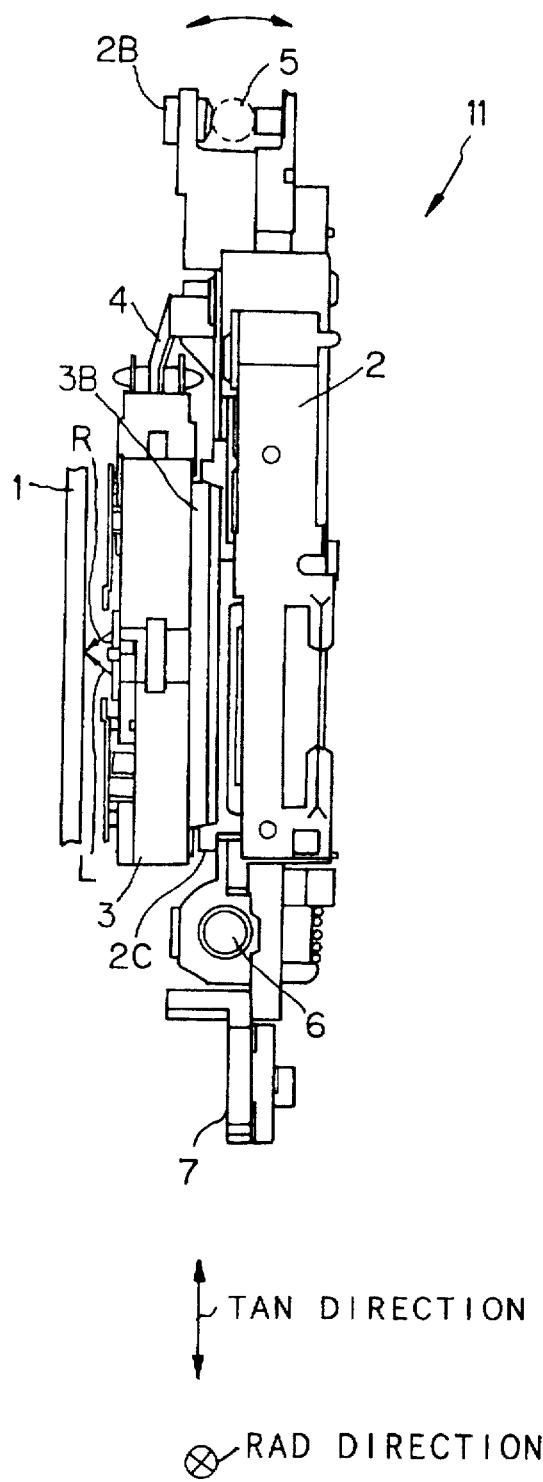
FIG. 3 is a right side view of the optical pickup.
Figure 4:
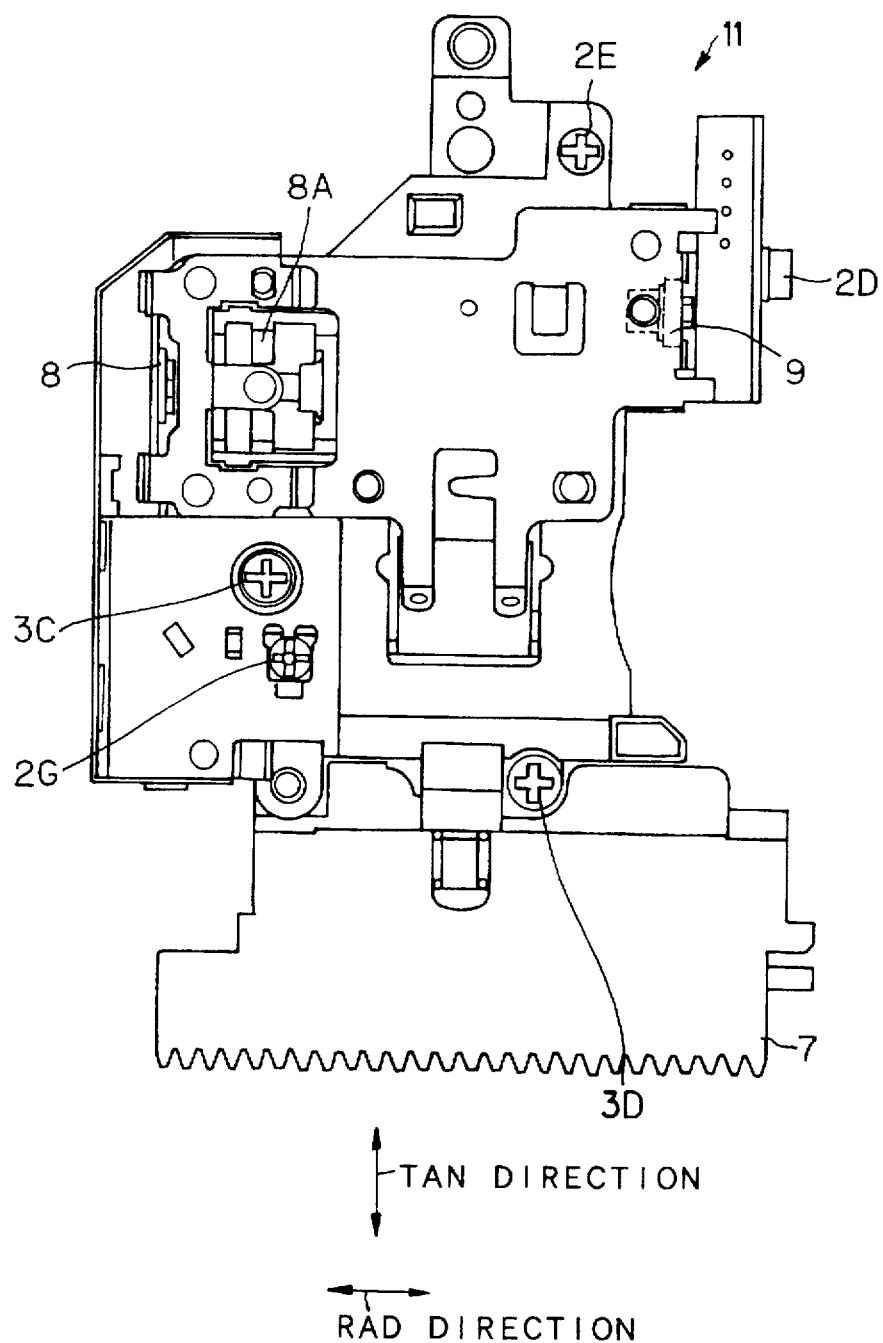
FIG. 4 is a rear elevation view of the optical pickup.

Next, an actual configuration of the optical pickup 11 which is a feature of the present invention is explained with reference to FIGS. 2 to 4. FIG. 2 is a plan view when looking at the optical pickup 11 from a side which the light beam L is irradiated from. FIG. 3 is a right side view of the optical pickup 11 in FIG. 2. FIG. 4 is a rear elevation view of FIG. 2. Moreover, directions represented by bi-directional arrows in FIGS. 2 to 4 respectively correspond to a direction parallel to the radial direction of the optical disk 1 (hereafter, referred to as a "RAD (Radial) direction"), and a direction parallel to a rotational direction of the optical disk 1 (hereafter, referred to as a "TAN (Tangential) direction").

At first, in the optical pickup 11 shown in FIG. 2, an actuator 3 having an objective lens R at a center thereof and also having an actuator frame 3A is supported on a support ring (described later) of a pickup body 2, as a spring receiving section 3E integrally formed on the actuator frame 3A is pressed by a press spring 4 in a direction perpendicular to a paper surface of FIG. 2. The pickup body 2 is linked to a sub body 2F, in a condition that it can be tilted in the RAD direction, around an axis parallel to the TAN direction as a center. Incidentally, a tilt angle (a pickup body fixing angle in the RAD direction) in the tilt around the axis parallel to the TAN direction of the pickup body 2 as the center is rotatably maintained on the sub body 2F, and is adjusted by rotating a pickup body RAD adjusting screw 2A, whose a tip is rotatably contacted with a screw receiving section (not shown) of the pickup body 2.

On the other hand, the sub body 2F can be moved in left and right directions in FIG. 2 with respect to a slider shaft 6 which penetrates a center of the sub body 2F. Since the slider shaft 6 is fixed on the carriage 15, the sub body 2F and the pickup body 2 can be moved in the RAD direction of the optical disk 1 on the carriage 15 in association with the reproduction of the record information. The movement to the RAD direction at this time is performed since a pinion (not shown) engaged with a rack 7 integrally fixed on the sub body 6 is rotated by the servo motor.

Moreover, a side opposite to the side supported on the sub body 2F of the pickup body 2 is movably supported on a guide shaft 5 in the left and right directions in FIG. 2, through a pickup body TAN adjusting screw 2B rotatably mounted in the pickup body 2. At this time, the pickup body TAN adjusting screw 2B is rotatably contacted with the guide shaft 5. Further, the guide shaft 5 is fixed on the carriage 15 so as to be positioned in parallel to the slider shaft 6.

Here, the pickup body 2 is tiltably supported on the slider shaft 6 and the guide shaft 5, around the slider shaft 6 which is an axis parallel to the RAD direction as a central axis. A tilt angle thereof (i.e. a pickup body fixing angle in the TAN direction) is adjusted by rotating the pickup body TAN adjusting screw 2B.

Moreover, the pickup body 2 is provided with a laser diode 9 for emitting the light beam L, a volume 2D for adjusting an output of the laser diode 9, a photo-diode 8 for receiving the reflection light from the optical disk 1 of the light beam L and so on.

Next, a junction state between the actuator 3 and the pickup body 2 is explained with reference to FIG. 3.

As shown in FIG. 3, a cylindrical junction 3B formed on a side of the pickup body 2 of the actuator 3 is in contact with an inside of a ringed actuator supporter 2C formed on a side of the actuator 3 of the pickup body 2. Under that condition, the actuator 3 is pressed in a right direction in FIG. 3 by a press spring 4. Thus, the actuator 3 is held on the pickup body 2. At this time, the actuator 3 can rotate on the actuator supporter 2C, likely to the swing of the pendulum, around the focal point of the light beam L emitted from the objective lens R as a center. The record information recorded on the optical disk 1 is reproduced by the emission of the light beam L from the objective lens R.

As can be also seen from FIG. 3, the pickup body 2 as a whole is tiltably supported on the guide shaft 5 by the pickup body TAN adjusting screw 2B, around the slider shaft 6 as the central axis.

Next, a mechanism of adjusting the tilt angle around the axis parallel to the TAN direction of the actuator 3 as a center, and the tilt angle around the axis parallel to the RAD direction as a center is explained with reference to FIG. 4.

As mentioned above, the actuator 3 is supported by the press spring 4, in such a way that the actuator 3 can rotate on the actuator supporter 2C, likely to the swing of the pendulum, around the focal point of the light beam L as the center. However, the tilt angle (the actuator fixing angle in the RAD direction) in the tilt around the axis parallel to the TAN direction of the actuator 3 as the center is adjusted by rotating an actuator RAD adjusting screw 3C, which is rotatably maintained on the pickup body 2 and whose tip is in contact with the surface on the side of the pickup body 2 of the actuator 3, as shown in FIG. 4.

The tilt angle (the actuator fixing angle in the TAN direction) in the tilt around the axis parallel to the RAD direction of the actuator 3 as the center is adjusted by rotating an actuator TAN adjusting screw 3D, which is rotatably maintained on the pickup body 2 and whose tip is in contact with the surface on the side of the pickup body 2 of the actuator 3, as shown in FIG. 4.

In FIG. 4, a multiple-lens 8, which includes a cylindrical lens for generating an astigmatism in the reflection light to enable a focus servo control and a condenser lens for condensing or collecting the reflection light onto the photodiode 8, is arranged on the light path of the reflection light from the optical disk 1 of the light beam L incident onto the photo detector 8 within the pickup body 2. Moreover, FIG. 4 shows a grating adjusting screw 2E for adjusting the grating (interference element) arranged on the light path of the light beam L, and an RF volume 2G for adjusting an output level of the RF signal outputted by the optical pickup 11 as a result of the reception of the reflection light of the light beam L by means of the photo detector 8.

By the above explained configuration of the optical pickup 11, it is possible to individually adjust the tilt angle around the axis parallel to the TAN direction as the center and the tilt angle around the axis parallel to the RAD direction as the center, in the actuator 3 and the pickup body 2 respectively.

(II) Principle Of Coma Aberration Correcting Method

Next, types of the coma aberrations generated when reproducing the record information recorded on the optical disk 1 by using the optical pickup 11, and a relationship between the magnitude of each of these coma aberrations and an angle of the optical disk 1 with respect to the actuator 3 or the pickup body 2 are explained with reference to FIGS. 5A to 7C, before explaining the coma aberration correcting method in accordance with the present invention in the optical pickup 11 shown in FIGS. 2 to 4.

Figure 5A:
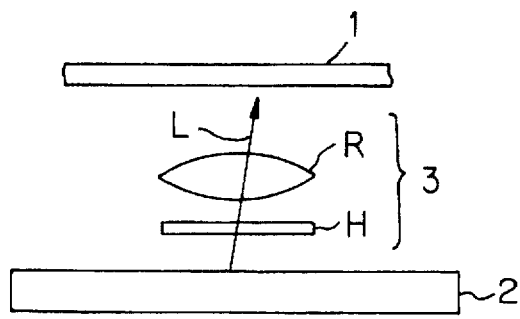
FIG. 5A is a diagram showing an off-axis property comma aberration.
Figure 5B:
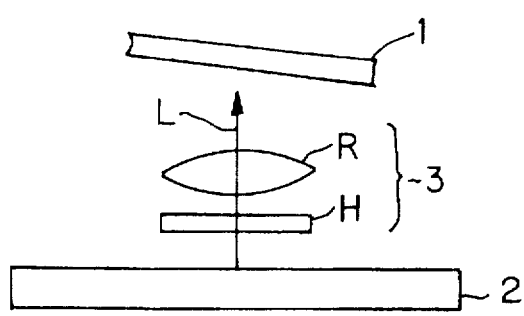
FIG. 5B is a diagram showing a disk skew comma aberration.
Figure 5C:
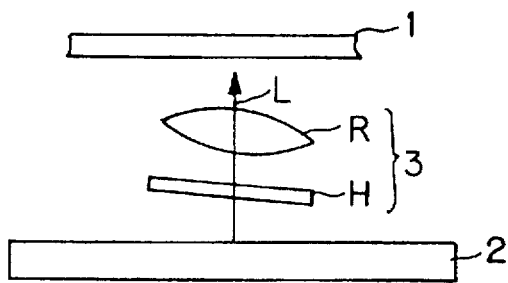
FIG. 5C is a diagram showing a lens skew comma aberration.

There are three types of coma aberrations as shown in FIGS. 5A to 5C, as the coma aberrations generated when reproducing the record information recorded on the optical disk 1 by using the optical pickup 11.

As shown in FIG. 5A, a first coma aberration among them is a coma aberration resulting from the fact described below. That is, although the optical disk 1, the pickup body 2 and the actuator 3 are parallel to each other as shown in FIG. 5A, the light beam L is not emitted perpendicularly from the pickup body 3 due to an error in a reflection surface of the reflection mirror for directing the light beam L toward the optical disk 1 included in the pickup body 2 and thereby the light beam L is irradiated obliquely to the optical disk 1. This coma aberration resulting from this off-set of the emission angle of the light beam L from an axis in the perpendicular direction with respect to the pickup body 3 is referred to as an "off-axis property coma aberration", hereafter.

Next, as shown in FIG. 5B, a second coma aberration is a coma aberration resulting from the fact described below. That is, although the pickup body 2 and the actuator 3 are parallel to each other as shown in FIG. 5B, the whole pickup body 2 including the actuator 3 is tilted with respect to the optical disk 1 and thereby the light beam L is irradiated obliquely onto the optical disk 1. This coma aberration resulting from the tilt of the whole pickup body 2 is hereafter referred to as a "disk skew (suitably, abbreviated as "DS") coma aberration".

Finally, as shown in FIG. 5C, a third coma aberration is a coma aberration resulting from the fact described below. That is, although the pickup body 2 and the optical disk 1 are parallel to each other as shown in FIG. 5C, only the actuator 3 is tilted with respect to the optical disk 1 and thereby the light beam L is irradiated obliquely onto the optical disk 1. The coma aberration resulting from the tilt of only the actuator 3 is hereafter referred to as a "lens skew (suitably, abbreviated as "LS") coma aberration".

Figure 6A:
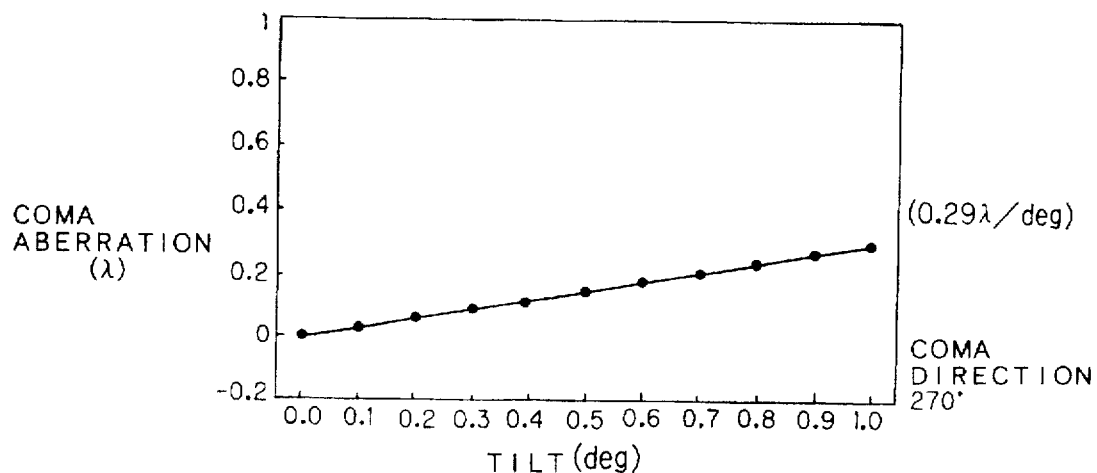
FIG. 6A is a graph showing a change of the off-axis comma aberration in case of a DVD (i.e. 0 order light)
Figure 6B:
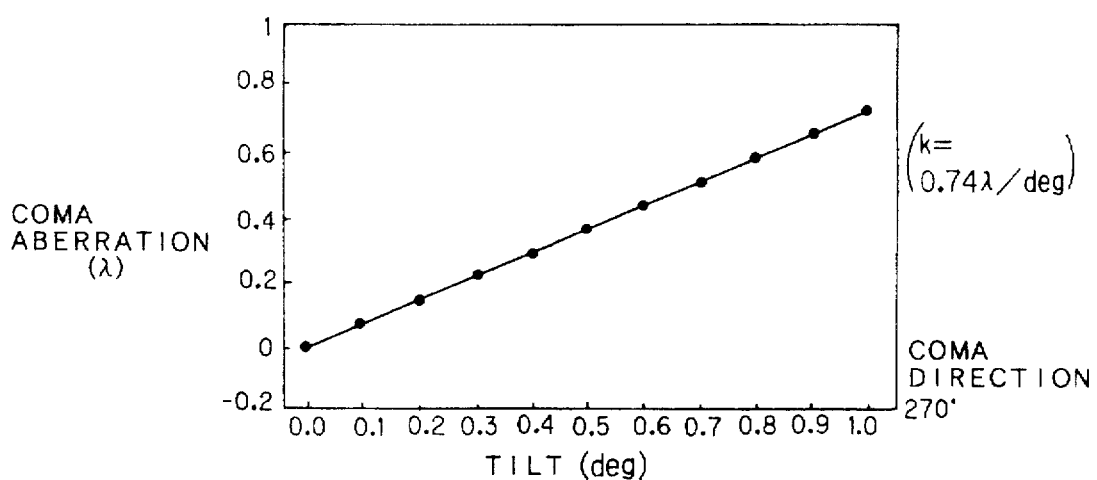
FIG. 6B is a graph showing a change of the disk skew comma aberration in case of the DVD.
Figure 6C:
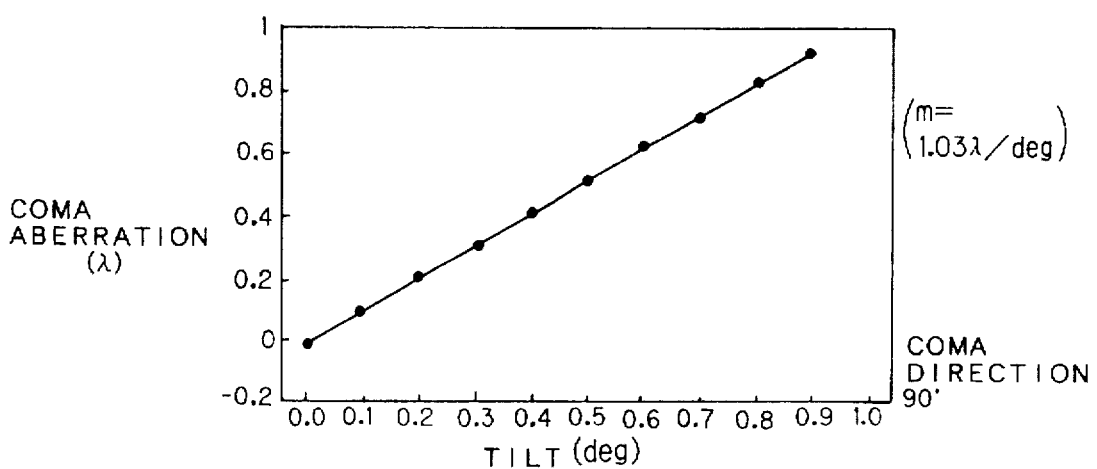
FIG. 6C is a graph showing a change of the lens skew comma aberration in case of the DVD.
Figure 7A:
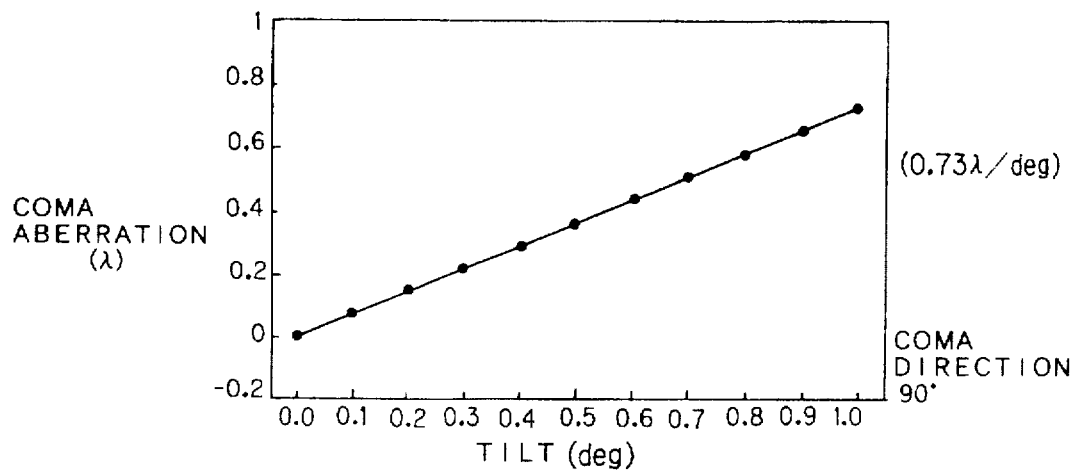
FIG. 7A is a graph showing a change of the off-axis comma aberration in case of a CD (i.e. +1 order light)
Figure 7B:
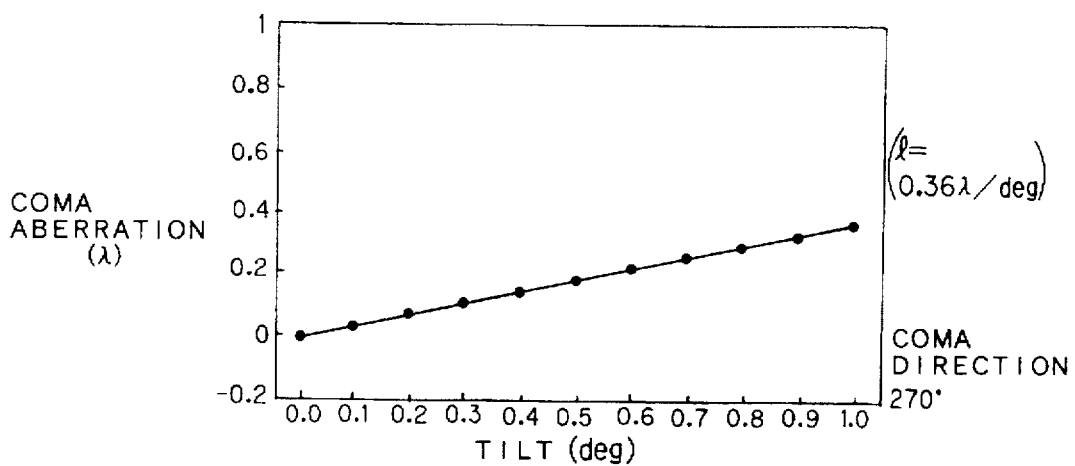
FIG. 7B is a graph showing a change of the disk skew comma aberration in case of the CD.
Figure 7C:
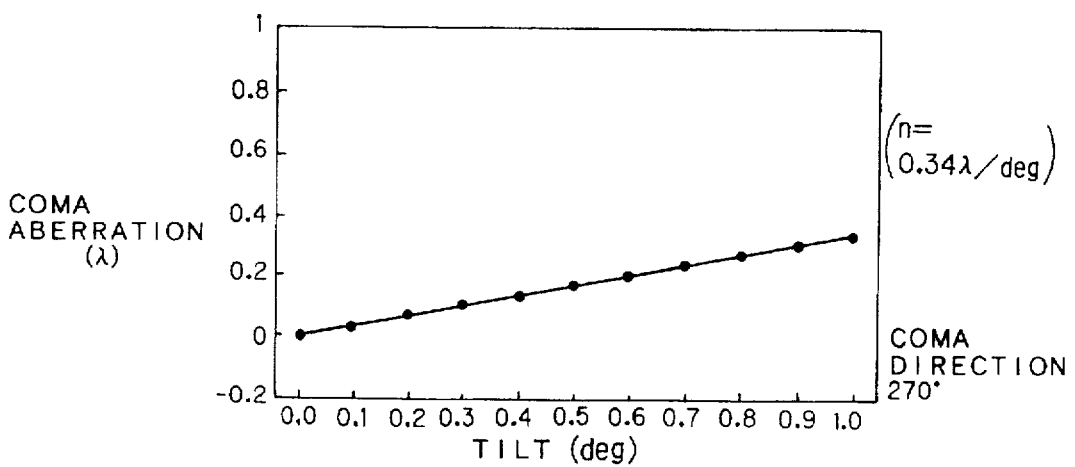
FIG. 7C is a graph showing a change of the lens skew comma aberration in case of the CD.

Next, the relationship between the magnitudes of each of these coma aberrations and the angle of the optical disk 1 with respect to the actuator 3 or the pickup body 2 is explained with reference to FIGS. 6A and 7C, by using as an example the coma aberration generated in the RAD direction (i.e. the coma aberration resulting from the tilt around the axis parallel to the TAN direction as a center in the actuator 3 or the pickup body 2). FIGS. 6A to 6C show the respective coma aberrations in case that the optical disk 1 is the DVD. FIGS. 7A to 7C show the respective coma aberrations in case that the optical disk 1 is the CD. As for the generation directions in the respective coma aberrations in FIGS. 6A to 7C, when looking at the pickup body 3 from a side from which the light beam L is emitted (corresponding to FIG. 2), the direction in which the pickup body 3 is clockwise rotated by 90 degrees from the TAN direction (the right direction in FIG. 2) is defined as a 90-degree direction, the direction in which the pickup body 3 is clockwise rotated by 270 degrees from the TAN direction (the left direction in FIG. 2) is defined as a 270-degree direction, and so on.

At first, a case is explained where the optical disk 1 is the DVD. As for the relationship between the magnitude of the off-axis property coma aberration and the tilt angle of the light beam L (0 order light) with respect to the pickup body 2, it is experimentally known by the present applicant that, when the emission angle of the light beam L is tilted by 1 degree in the 90-degree direction, the coma aberration is generated at a rate of 0.29 $\lambda$ ($\lambda$ is the wave length of the light beam L) in the 270-degree direction, as shown in FIG. 6A.

As for the relationship between the magnitude of the disk skew coma aberration and the tilt angle of the pickup body 2 with respect to the optical disk 1, it is experimentally known by the present applicant that, when the pickup body 2 is tilted by 1 degree in the 90-degree direction, the coma aberration is generated at a rate of 0.74 $\lambda$ in the 270-degree direction, as shown in FIG. 6B. A variation rate of this disk skew coma aberration is defined as "k", hereinafter.

Moreover, as for the relationship between the magnitude of the lens skew coma aberration and the tilt angle of the actuator 3 with respect to the optical disk 1, it is experimentally known by the present applicant that, when the actuator 3 is tilted by 1 degree in the 90-degree direction, the coma aberration is generated at a rate of 1.03 $\lambda$ in the 90-degree direction, as shown in FIG. 6C. A variation rate of this lens skew coma aberration is defined as "m", hereinafter.

Next, a case is explained where the optical disk 1 is the CD. As for the relationship between the magnitude of the off-axis property coma aberration and the tilt angle of the light beam L (+1 order light) with respect to the pickup body 2, it is experimentally known by the present applicant that, when the emission angle of the light beam L is tilted by 1 degree in the 90-degree direction, the coma aberration is generated at a rate of 0.73 $\lambda$ in the 90-degree direction, as shown in FIG. 7A.

As for the relationship between the magnitude of the disk skew coma aberration and the tilt angle of the pickup body 2 with respect to the optical disk 1, it is experimentally known by the present applicant that, when the pickup body 2 is tilted by 1 degree in the 90-degree direction, the coma aberration is generated at a rate of 0.36 λ in the 270-degree direction, as shown in FIG. 7B. A variation rate of this disk skew coma aberration is defined as "1", hereinafter.

Moreover, as for the relationship between the magnitude of the lens skew coma aberration and the tilt angle of the actuator 3 with respect to the optical disk 1, it is experimentally known by the present applicant that, when the actuator 3 is tilted by 1 degree in the 90-degree direction, the coma aberration is generated at a rate of 0.34 λ in the 270-degree direction, as shown in FIG. 7C. A variation rate of this lens skew coma aberration is defined as "n", hereinafter.

In the above mentioned relationships between the magnitudes of the respective coma aberrations and the angle of the actuator 3 or the pickup body 2 with respect to the optical disk 1, it is noted that the directions of the lens skew coma aberrations generated in the cases of the DVD (0 order light) and the CD (+1 order light) are opposite to each other, although the actuator 3 is tilted in the same directions in both the cases, as for the lens skew coma aberration. The present invention utilizes this phenomenon to thereby correct the generated coma aberration.

Incidentally, the coma aberrations generated in the direction parallel to the RAD direction are explained in the above explanations. However, as for the respective types of the coma aberrations generated in the TAN direction due to the tilt of the pickup body 2 or the actuator 3 around the axis parallel to the RAD direction as the center, it is experimentally confirmed by the present applicant that the relationships between the magnitudes of the respective coma aberrations and the angle of the actuator 3 or the pickup body 2 with respect to the optical disk 1 are similar to the relationships shown in FIGS. 6A to 7C.

Next, the principle of the coma aberration correcting method in accordance with the present invention is explained with reference to FIG. 8. The principle is explained hereinbelow as for the method of correcting the coma aberration generated in the RAD direction. The correction of the coma aberration in accordance with the present invention is performed such that the tilts are separately adjusted for the pickup body 2 itself including the actuator 3 and for only the actuator 3, so that the coma aberration finally approaches to or become zero, by utilizing the above explained phenomenon that the generation directions of the lens skew coma aberration for the DVD and the CD are opposite to each other.

In the present invention, at first, the actuator 3 and the pickup body 2 are respectively made parallel to the optical disk 1. Then, while the actuator 3 is fixed on the pickup body 2, the pickup body 2 is tilted around the axis parallel to the TAN direction as the center. For both of the cases that the optical disk 1 is the DVD and that it is the CD, each of the optimum angles is determined, which is the tilt angle of the pickup body 2 when the coma aberration (off-axis property coma aberration) generated in the RAD direction is zero or the minimum. This optimum angle is determined by calculating the error rate and calculating a tilt angle at which the calculated error rate is the minimum, by the system controller 17. In FIG. 8, a point A ($X_1$, 0) is assumed to give the optimum angle of the pickup body 2 when the off-axis property coma aberration is zero in case that the optical disk 1 is the DVD, and a point B ($X_2$, 0) is assumed to give the optimum angle of the pickup body 2 when the off-axis property coma aberration is zero in case that the optical disk 1 is the CD.

Next, in order to finally make all the coma aberrations zero, a pickup body fixing angle is determined, which is the tilt angle at which the pickup body 2 is to be tilted around the axis parallel to the TAN direction as the center.

Figure 8:
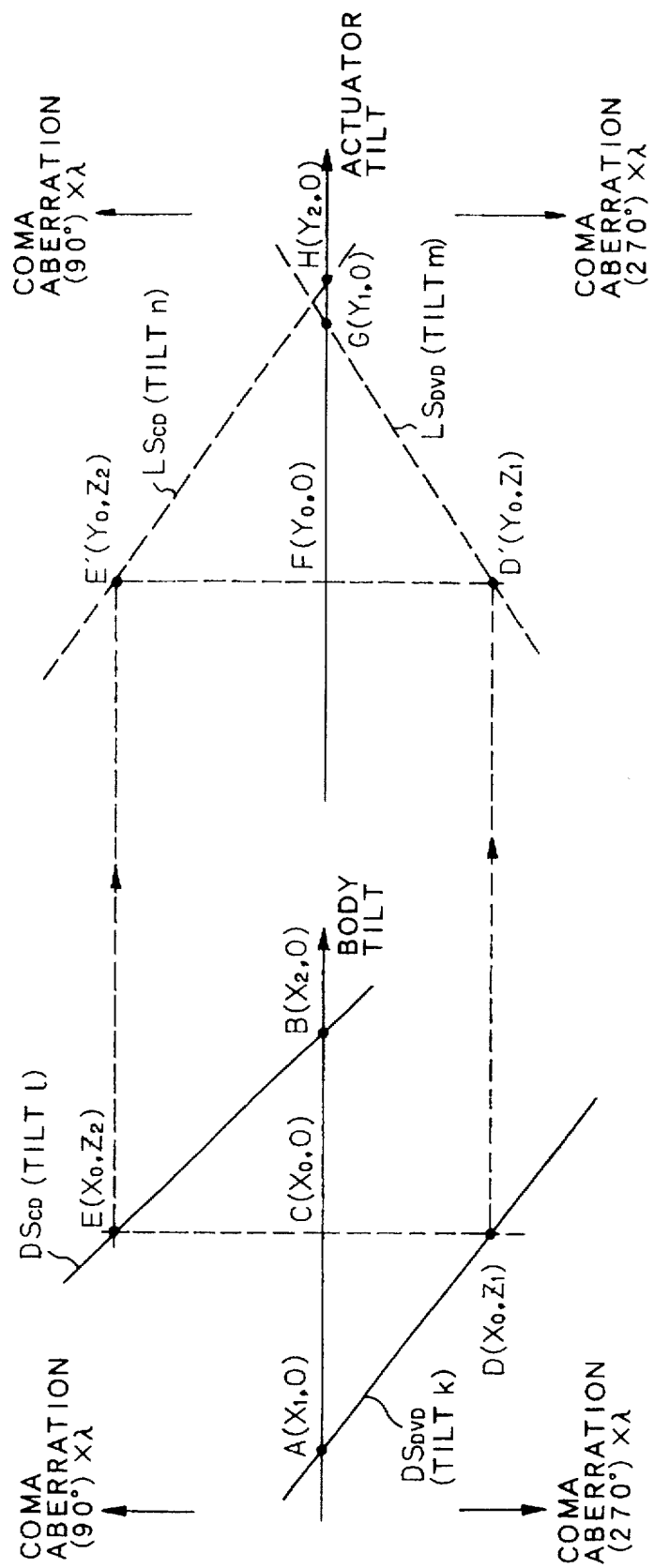
FIG. 8 is a diagram showing a principle of the present invention.

In that case, in order to fix the pickup body 2 on the carriage 15 at the pickup body fixing angle and then tilt only the actuator 3 around the axis parallel to the TAN direction as the center to finally make the coma aberration in the RAD direction zero, as shown in FIG. 8, the coma aberration generated when the pickup body 2 is fixed at the pickup body fixing angle (corresponding to a point C ($X_0$, 0) in a left view of FIG. 8) must be canceled or compensated by tilting only the actuator 3 (in the left view of FIG. 8, the coma aberration generated in case that the optical disk 1 is the DVD corresponds to a point D ($X_0$, $Z_1$), and the coma aberration generated in case that the optical disk 1 is the CD corresponds to a point E ($X_0$, $Z_2$)). Incidentally, in the left view of FIG. 8, a straight line $DS_{CD}$ (tilt 1) indicates a variation of the DS coma aberration (FIG. 7B) when the pickup body 2 is tilted in case that the optical disk 1 is the CD, and a straight line $DS_{DVD}$ (tilt k) indicates a variation of the DS coma aberration (FIG. 6B) when the pickup body 2 is tilted in case that the optical disk 1 is the DVD.

Thus, in order to tilt only the actuator 3 to thereby cancel or compensate the coma aberration generated when the pickup body 2 is fixed, it is necessary to respectively make the already generated coma aberrations (corresponding to a point E' ($Y_0$, $Z_2$) and a point D' ($Y_0$, $Z_1$)) zero by tilting the actuator 3 around the axis parallel to the TAN direction as the central axis, at the common tilt angle, in a right view of FIG. 8. Hence, it is necessary that a point G ($Y_1$, 0) and a point H ($Y_2$, 0) are coincident with each other in the right view of FIG. 8. That is, it is necessary that the coma aberrations are made zero by the common tilt angle (actuator fixing angle) which is common to both of the cases that the optical disk 1 is the DVD and that it is the CD. Incidentally, in the right view of FIG. 8, a straight line $LS_{CD}$ (tilt n) indicates a variation of the LS coma aberration (FIG. 7C) when the actuator 3 is tilted in case that the optical disk 1 is the CD, and a straight line $LS_{DVD}$ (tilt m) indicates a variation of the LS coma aberration (FIG. 6C) when the actuator 3 is tilted in case that the optical disk 1 is the DVD.

Now, in the left view of FIG. 8:

$$Z_1/(X_0-X_1)=k$$

and;

$$Z_2/(X_0-X_2)=l.$$

Moreover, in the right view of FIG. 8:

$$Z_1/(Y_0-Y_1)=m$$

and;

$$Z_2/(Y_0-Y_2)=n.$$

Accordingly:

$$(X_0-X_1)/(X_0-X_2)=(l/k)\times(Z_1/Z_2) \quad (1)$$

and;

$$(Y_0-Y_1)/(Y_0-Y_2)=(n/m)\times(Z_1/Z_2) \quad (2).$$

When eliminating $Z_1$ and $Z_2$ from these equations (1) and (2):

$$(X_0-X_1)/(X_0-X_2)=(l/k)\times(m/n)\times(Y_0-Y_1)/(Y_0-Y_2) \quad (3).$$

In the equation (3), in order that the coma aberrations are made zero by the actuator fixing angle which is common to both of the cases of the DVD and the CD, a following equation should be satisfied.

$$Y_0-Y_1=Y_0-Y_2$$

Thus, $$(X_0-X_1)/(X_0-X_2)=(l/k)\times(m/n) \quad (4).$$

Here, when substituting the actually determined values l, k, m and n (refer to FIGS. 6A to 7C) about the pickup body 2 and the actuator 3 for the equation (4), since l=0.36, k=0.74, m=1.03 and n=0.34, it is expressed as following.

$$(X_0-X_1)/(X_0-X_2)=(l/k)\times(m/n)=1.47 \quad (5).$$

As a result, the point C ($X_0$, 0) that is the pickup body fixing angle can be obtained by obtaining the point A and the point B in the left view of FIG. 8 and then, on the basis of the coordinates thereof, calculating the point C ($X_0$, 0) from the equation (5). Moreover, when obtaining the actuator fixing angle, an angle difference between the angle indicated by the coincident points G ($Y_1$, 0) and H ($Y_2$, 0) and the angle indicated by the point F ($Y_0$, 0)) (in the left view of FIG. 8, corresponding to the point C ($X_0$, 0)) is equal to the actuator fixing angle to be obtained.

The coma aberration generated in the direction parallel to the RAD direction is explained in the above mentioned principle. However, the coma aberration generated in the TAN direction can be also made substantially zero by calculating the pickup body fixing angle and the actuator fixing angle based on the principle similar to that of the RAD direction.

(III) First Embodiment Of Coma Aberration Correcting Method

A first embodiment of the coma aberration correcting method in accordance with the present invention based on the above mentioned principle is explained with reference to FIGS. 9 and 10. In the first embodiment described below, the method of correcting the coma aberration generated in the RAD direction is explained similarly to the above mentioned principle. In FIG. 10, straight lines $DS_{CD}$ and $DS_{DVD}$ and straight lines $LS_{CD}$ and $LS_{DVD}$ have the meanings similar to those in FIG. 8, respectively. The tilts l, k, m and n of these straight lines are the tilts corresponding to the above mentioned actual values, respectively. Points A, B, C, D, D', E, E', F, G and H in FIG. 10 correspond to the points represented by the same symbols in FIG. 8, respectively. Moreover, in FIG. 10, as for the straight lines $DS_{CD}$ and $DS_{DVD}$ and the points A, B, C, D and E, a horizontal axis indicates the tilt angle of the pickup body 2 with respect to the optical disk 1. As for the straight lines $LS_{CD}$ and $LS_{DVD}$ and the points D', E', F, G and H, the horizontal axis indicates the tilt angle of the actuator 3 with respect to the optical disk 1. Further, in FIG. 10, a coma aberration at a point X at which the extended straight line $DS_{CD}$ crosses an axis of angle "0" (coma aberration axis) indicates the off-axis property coma aberration in a case where the optical disk 1 is the CD. A coma aberration at a point Y at which the extended straight line $DS_{DVD}$ crosses the coma aberration axis indicates the off-axis property coma aberration in a case where the optical disk 1 is the DVD.

Figure 9:
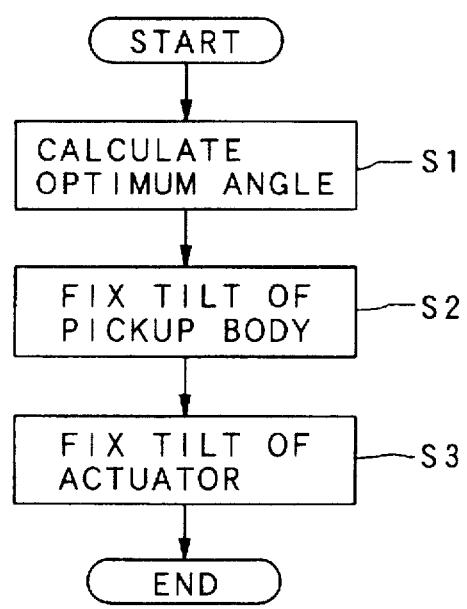
FIG. 9 is a flow chart showing an operation by a comma aberration correcting method as a first embodiment of the present invention.
Figure 10:
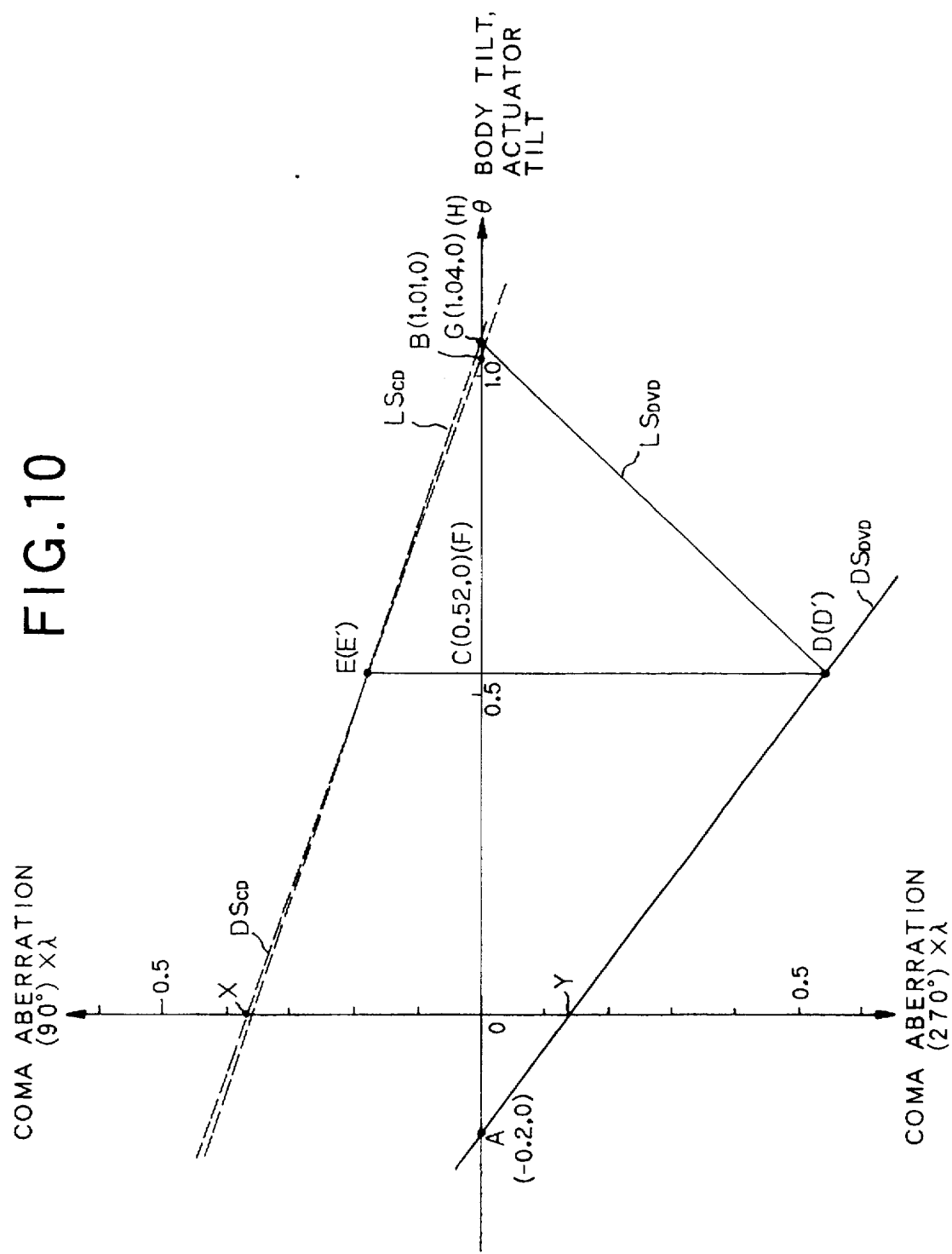
FIG. 10 is a graph showing a change of the coma aberration in the first embodiment.

In FIG. 9, in the first embodiment of the coma aberration correcting method, the above mentioned optimum angle is calculated for each of the cases that the optical disk 1 is the DVD and that it is the CD, by firstly tilting the pickup body 2, on which the actuator is fixed, and secondly calculating the error rate in the RF signal in the system controller 17 (Step S1). In FIG. 10, in case that the optical disk 1 is the DVD, the optimum angle is assumed to be −0.2 degrees, and in case that it is the CD, the optimum angle is assumed to be 1.01 degrees.

When the optimum angle is calculated (Step S1), the pickup body fixing angle is calculated according to the aforementioned principle, and the pickup body RAD adjusting screw 2A is adjusted so as to have the calculated pickup body fixing angle, and then the pickup body 2 is fixed on the sub body 2F (Step S2). In a case shown in FIG. 10, the point A has the coordinates (−0.2, 0), and the point B has the coordinates (1.01, 0). Thus, the value of (($X_0-X_1$)+($X_0-X_2$)) in the left view of FIG. 8 is calculated as following.

$$1.01+0.2=1.21$$

From this relation and the equation (5):

$$(X_0-X_1)=0.72$$

$$(X_0-X_2)=0.49.$$

Thus, the coordinates at the point C, that is, the pickup body fixing angle is calculated as following.

$$0.72-0.2=0.52 \text{ (degrees)}$$

Thus, the pickup body 2 may be tilted and fixed on the sub body 2F so as to have the angle of 0.52 degrees in the 270-degree direction with respect to the optical disk 1.

When the pickup body 2 is fixed on the sub body 2F at the step S2, the actuator fixing angle is calculated according to the aforementioned principle, and the actuator RAD adjusting screw 3C is adjusted so as to have the calculated actuator fixing angle, and then the actuator 3 is fixed on the pickup body 2 (Step S3). In the case shown in FIG. 10, a side CD is common to both of the triangles ABC and GCD (GFD'). Hence, an angle difference Δ between the point G and the point C (F) corresponding to the actuator fixing angle is expressed as following.

$$\begin{aligned}\Delta &= k/m \times \text{(the angle difference between the} \\ &\quad \text{point } A \text{ and the point } C) \\ &= 0.52 \text{ (degrees)}\end{aligned}$$

Hence, the actuator 3 may be adjusted so as to have the angle of 0.52 degrees in the 270-degree direction with respect to the optical disk 1, after the pickup body 2 is fixed on the sub body 2F. Incidentally, since the point G has the coordinates (1.04 (0.52+0.52), 0) at this time, the angle between the objective lens R and the optical disk 1 is 1.04 degrees, after the actuator 3 is tilted and fixed on the pickup body 2.

When the adjustment of the actuator 3 is finished as mentioned above, all of the coma aberrations are made substantially zero as shown in FIG. 10, and thereby the adjustment for the coma aberration correction is finished.

Incidentally, the correction of the coma aberration generated in the direction parallel to the RAD direction is explained in the first embodiment. However, the coma aberration generated in the TAN direction can be also made substantially zero by the adjustment similar to that in the RAD direction.

As mentioned above, according to the first embodiment of the coma aberration correcting method, the coma aberration can be made substantially zero by: determining the optimum angle for the pickup body 2 at which the error rate is the minimum as for each of the cases that the optical disk 1 is the DVD and that it is the CD; determining the pickup body fixing angle and the actuator fixing angle; and fixing the pickup body 2 and the actuator 3 so as to respectively have these calculated fixing angles. As a result, it is possible to make all the kinds of the coma aberrations substantially zero, in the optical pickup 11 for emitting the 0 order light and the +1 order light.

(IV) Second Embodiment Of Coma Aberration Correcting Method

Figure 11:
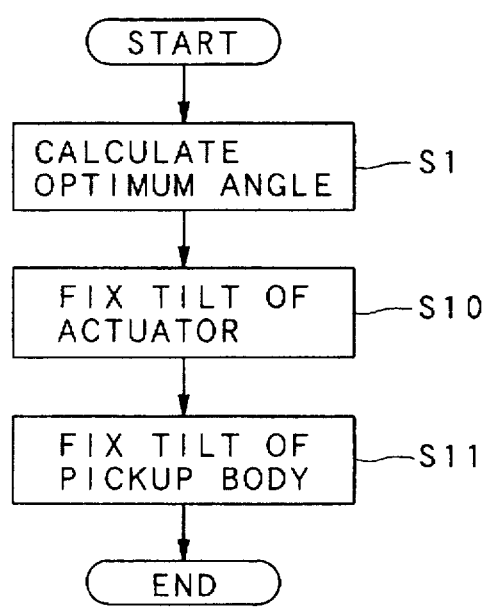
FIG. 11 is a flow chart showing an operation by a comma aberration correcting method as a second embodiment of the present invention.

In the first embodiment, after the calculation of the optimum angle, the pickup body fixing angle is calculated, and then the pickup body 2 is fixed on the carriage 15. After that, the actuator fixing angle is calculated, and then the actuator 3 is fixed on the pickup body 2. In addition to that way, another method may be possible as follows. That is, the optimum angle, the pickup body fixing angle and the actuator fixing angle are calculated by the above mentioned way. Then, as shown in FIG. 11, in case of actually adjusting the respective tilt angles of the pickup body 2 and the actuator 3, after the calculation of the optimum angle (Step S1), the actuator 3 is fixed on the pickup body 2 based on the actuator fixing angle calculated according to the optimum angle and the pickup body fixing angle (Step S10), and then, the pickup body 2 on which the actuator 3 is fixed according to the pickup body fixing angle is fixed on the sub body 2F (Step S11). Even if doing so, it is possible to make all the kinds of the coma aberrations substantially zero, in the optical pickup 11 which emits the 0 order light and the +1 order light, similarly to the first embodiment.

(V) Third Embodiment Of Coma Aberration Correcting Method

In the first and second embodiments of the above mentioned coma aberration correcting method, the case has been explained where the present invention is applied to the optical pickup 11 which generates the 0 order light and the +1 order light by using the objective lens R and the diffraction grating H included in the actuator 3. In addition to that case, the present invention can be applied to an optical pickup which generates the 0 order light and the +1 order light by using a concave lens.

Figure 12:
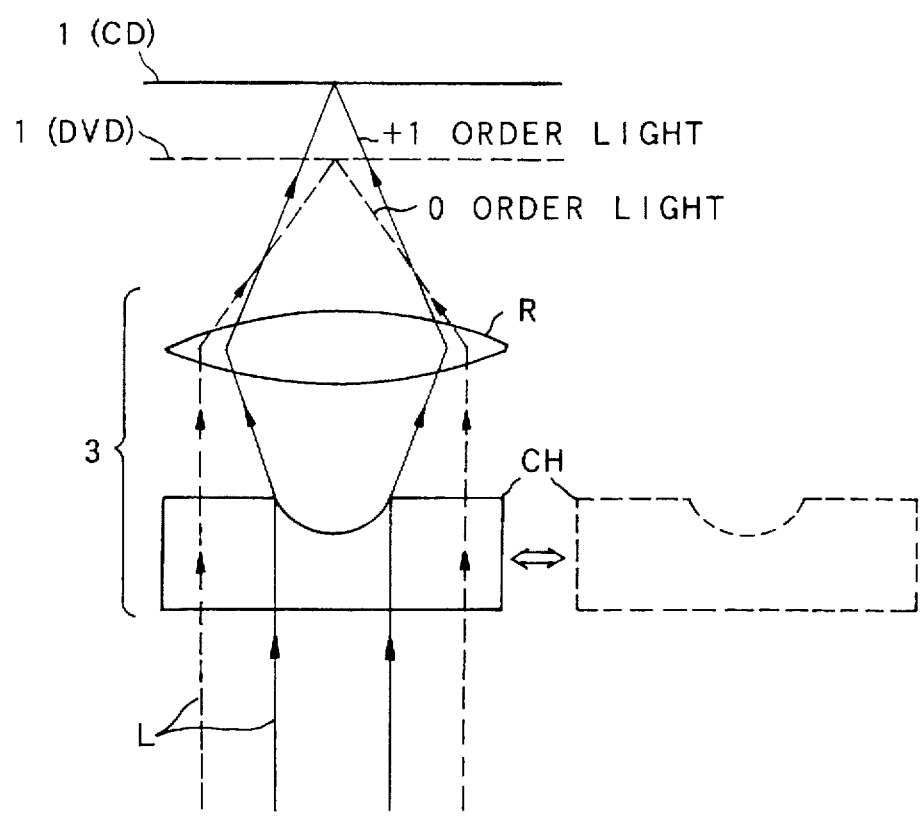
FIG. 12 is a diagram showing a structure of an actuator in a third embodiment of the present invention.

That is, as shown in FIG. 12, the present invention can be applied to an optical pickup in which, at a time of generating the 0 order light, only an objective lens R exists on the light path of the light beam L, and, at a time of generating the +1 order light, a concave lens CH is inserted before the objective lens R on the light path of the light beam L to thereby change the light path of the light beam L. Accordingly, the +1 order light is focused on a farther position than the 0 order light with respect to the objective lens R. In that case, it is considered that the actuator 3 includes the objective lens R, a concave lens moving mechanism for inserting the objective lens R and the concave lens CH on the light path of the light beam L. The actuator fixing angle is calculated from the above mentioned way, and then the actuator 3 is fixed on the pickup body 2.

Since other methods of calculating the optimum angle and the pickup body fixing angle are similar to those of the first and second embodiments, the explanations of the detailed portions are omitted.

According to the third embodiment of the coma aberration correcting method as mentioned above, all the kinds of the coma aberrations can be made substantially zero, even in the optical pickup for generating the 0 order light and the +1 order light by one objective lens R, in conjunction with the movement of the concave lens CH.

In addition to the above mentioned respective embodiments, the present invention can be widely applied to a multiple-focal optical pickup for generating light beams having a plurality of focuses by using an objective lens.

The cases in which the present invention is applied to the optical pickup in the information reproducing apparatus S have been explained in the previous explanations. However, the present invention is not limited to the above mentioned cases. Hence, the present invention can be applied to an optical pickup in an information recording apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A coma aberration correcting method in an optical pickup for generating a plurality of light beams forming a plurality of light focused points respectively through an objective lens to thereby record and/or reproduce information onto and/or from a plurality of types of information record media corresponding to the light beams respectively, said optical pickup comprising (i) an actuator containing a light generation device for generating the light beams based on a source light beam and said objective lens for respectively collecting the light beams generated by said light generation device on said information record media respectively and (ii) a pickup body containing an optical section for generating the source light beam, said method comprising:

a measuring process of measuring an optimum angle, for each of the light beams, which is an angle with respect to respective one of said information record media of said pickup body at which an error rate is the minimum at a time of reproducing the information, by tilting said pickup body with respect to respective one of said information record media while irradiating each of the light beams onto respective one of said information record media under a condition where said actuator is fixed on said pickup body;

a body angle calculating process of calculating a pickup body fixing angle, which is an angle with respect to respective one of said information record media at a time of fixing said pickup body on a supporting device for supporting said pickup body, on the basis of (i) a first variation rate measured in advance, which is a variation rate of a coma aberration with respect to a tilt angle of said actuator generated on respective one of said information record media in correspondence with each of the light beams in case that only said actuator is tilted with respect to respective one of said information record media, (ii) a second variation rate measured in advance, which is a variation rate of a coma aberration with respect to a tilt angle of said pickup body generated on respective one of said information record media in correspondence with each of the light beams in case that said actuator is fixed on said pickup body and that said pickup body as a whole is tilted with respect to respective one of said information record media, and (iii) the measured optimum angle;

an actuator angle calculating process of calculating an actuator fixing angle, which is an angle with respect to respective one of said information record media at a time of fixing said actuator on said pickup body, on the basis of the first variation rate, the second variation rate and the measured optimum angle; and a fixing process of fixing said pickup body on said supporting device so as to have the calculated pickup body fixing angle, and fixing said actuator on said pickup body so as to have the calculated actuator fixing angle.

2. A coma aberration correcting method according to claim 1, wherein said light generation device comprises a hologram diffraction element disposed on an optical path of the source light beam.

3. A coma aberration correcting method according to claim 1, wherein said light generation device generates one of the light beams by inserting a concave lens on an optical path of the source light beam and inputting the source light beam through said concave lens into said objective lens, and generates another of the light beams by inputting the source light beam directly into said objective lens.

4. A coma aberration correcting method in an optical pickup for generating a plurality of light beams forming a plurality of light focused points respectively through an objective lens to thereby record and/or reproduce information onto and/or from a plurality of types of information record media corresponding to the light beams respectively, said optical pickup comprising (i) an actuator containing a light generation device for generating the light beams based on a source light beam and said objective lens for respectively collecting the light beams generated by said light generation device on said information record media respectively and (ii) a pickup body containing an optical section for generating the source light beam, said method comprising:

a measuring process of measuring an optimum angle, for each of the light beams, which is an angle with respect to respective one of said information record media of said pickup body at which an error rate is the minimum at a time of reproducing the information, by tilting said pickup body with respect to respective one of said information record media while irradiating each of the light beams onto respective one of said information record media under a condition where said actuator is fixed on said pickup body;

a body angle calculating process of calculating a pickup body fixing angle, which is an angle with respect to respective one of said information record media at a time of fixing said pickup body on a supporting device for supporting said pickup body, on the basis of (i) a first variation rate measured in advance, which is a variation rate of a coma aberration with respect to a tilt angle of said actuator generated on respective one of said information record media in correspondence with each of the light beams in case that only said actuator is tilted with respect to respective one of said information record media, (ii) a second variation rate measured in advance, which is a variation rate of a coma aberration with respect to a tilt angle of said pickup body generated on respective one of said information record media in correspondence with each of the light beams in case that said actuator is fixed on said pickup body and that said pickup body as a whole is tilted with respect to respective one of said information record media, and (iii) the measured optimum angle;

a body fixing process of fixing said pickup body on said supporting device so as to have the calculated pickup body fixing angle;

an actuator angle calculating process of calculating an actuator fixing angle, which is an angle with respect to respective one of said information record media at a time of fixing said actuator on said pickup body, after said body fixing process, on the basis of the first variation rate, the second variation rate and the measured optimum angle; and an actuator fixing process of fixing said actuator on said pickup body so as to have the calculated actuator fixing angle.

5. A coma aberration correcting method according to claim 4, wherein said light generation device comprises a hologram diffraction element disposed on an optical path of the source light beam.

6. A coma aberration correcting method according to claim 4, wherein said light generation device generates one of the light beams by inserting a concave lens on an optical path of the source light beam and inputting the source light beam through said concave lens into said objective lens, and generates another of the light beams by inputting the source light beam directly into said objective lens.

7. A coma aberration correcting apparatus in an optical pickup for generating a plurality of light beams forming a plurality of light focused points respectively through an objective lens to thereby record and/or reproduce information onto and/or from a plurality of types of information record media corresponding to the light beams respectively, said optical pickup comprising (i) an actuator containing a light generation device for generating the light beams based on a source light beam and said objective lens for respectively collecting the light beams generated by said light generation device on said information record media respectively and (ii) a pickup body containing an optical section for generating the source light beam, said apparatus comprising:

a body fixing device for fixing said pickup body on a supporting device for supporting said pickup body so as to have a pickup body fixing angle, which is an angle with respect to respective one of said information record media at a time of fixing said pickup body on said supporting device, the pickup body fixing angle being calculated on the basis of (i) a first variation rate measured in advance, which is a variation rate of a coma aberration with respect to a tilt angle of said actuator generated on respective one of said information record media in correspondence with each of the light beams in case that only said actuator is tilted with respect to respective one of said information record media, (ii) a second variation rate measured in advance, which is a variation rate of a coma aberration with respect to a tilt angle of said pickup body generated on respective one of said information record media in correspondence with each of the light beams in case that said actuator is fixed on said pickup body and that said pickup body as a whole is tilted with respect to respective one of said information record media, and (iii) an optimum angle, for each of the light beams, which is an angle with respect to respective one of said information record media of said pickup body at which an error rate is the minimum at a time of reproducing the information, the optimum angle being measured by tilting said pickup body with respect to respective one of said information record media while irradiating each of the light beams onto respective one of said information record media under a condition where said actuator is fixed on said pickup body; and an actuator fixing device for fixing said actuator on said pickup body so as to have an actuator fixing angle, which is an angle with respect to respective one of said information record media at a time of fixing said actuator on said pickup body, the actuator fixing angle being calculated on the basis of the first variation rate, the second variation rate and the measured optimum angle.

8. A coma aberration correcting apparatus according to claim 7, further comprising:

a measuring device for measuring the optimum angle;

a body angle calculating device for calculating the pickup body fixing angle; and an actuator angle calculating device for calculating the actuator fixing angle.

9. A coma aberration correcting apparatus according to claim 7, wherein said light generation device comprises a hologram diffraction element disposed on an optical path of the source light beam.

10. A coma aberration correcting apparatus according to claim 7, wherein said light generation device generates one of the light beams by inserting a concave lens on an optical path of the source light beam and inputting the source light beam through said concave lens into said objective lens, and generates another of the light beams by inputting the source light beam directly into said objective lens.

* * * * *